(12) United States Patent
Thomas

(10) Patent No.: US 10,856,539 B2
(45) Date of Patent: Dec. 8, 2020

(54) ROD HOLDER ASSEMBLY AND METHOD OF USING THE SAME

(71) Applicant: Jeffrey Scott Thomas, Dunn, NC (US)

(72) Inventor: Jeffrey Scott Thomas, Dunn, NC (US)

(*) Notice: Subject to any disclaimer, the term of this patent is extended or adjusted under 35 U.S.C. 154(b) by 505 days.

(21) Appl. No.: 15/064,088

(22) Filed: Mar. 8, 2016

(65) Prior Publication Data
US 2016/0255823 A1 Sep. 8, 2016

Related U.S. Application Data

(60) Provisional application No. 62/177,239, filed on Mar. 8, 2015.

(51) Int. Cl.
*A01K 97/10* (2006.01)

(52) U.S. Cl.
CPC .................... *A01K 97/10* (2013.01)

(58) Field of Classification Search
CPC ........................................ A01K 97/10
USPC .......... 43/21.2; 248/511, 514–516, 518, 519, 248/521, 523, 526, 534, 535, 538, 539; 403/90; 279/42, 43
See application file for complete search history.

(56) References Cited

U.S. PATENT DOCUMENTS

| | | | | |
|---|---|---|---|---|
| 454,553 A * | 6/1891 | Whitten | ................. | F16M 11/14 108/1 |
| 483,311 A * | 9/1892 | Remaly | .................. | A01B 15/10 172/740 |
| 673,541 A * | 5/1901 | Hussey | ..................... | E04B 1/19 403/73 |
| 675,106 A * | 5/1901 | Oberle | ...................... | F16L 3/26 248/182.1 |
| 684,451 A * | 10/1901 | Mowry | ................... | F16C 11/06 116/173 |
| 778,977 A * | 1/1905 | Johnson | .............. | F16C 11/0633 279/44 |
| 892,105 A * | 6/1908 | White | ..................... | F16L 3/202 122/510 |
| 973,319 A * | 10/1910 | Thunen | ...................... | B62J 6/02 248/230.5 |
| 993,757 A * | 5/1911 | Chrysler | ............. | F16C 11/0633 403/141 |
| 1,202,698 A * | 10/1916 | Ford | ..................... | B23B 31/202 279/42 |
| 1,608,795 A * | 11/1926 | Kennedy | ................ | A01K 97/10 248/516 |
| 1,789,509 A * | 1/1931 | Bergstrom | ............. | A01K 97/10 248/276.1 |
| 2,128,046 A * | 8/1938 | Hell | ....................... | A47B 11/00 108/6 |

(Continued)

FOREIGN PATENT DOCUMENTS

JP 2000023609 A * 1/2000
JP 2002291390 A * 10/2002

*Primary Examiner* — Darren W Ark
(74) *Attorney, Agent, or Firm* — FisherBroyles, LLP; Frank W. Leak, Jr.

(57) ABSTRACT

Herein described is a rod holder assembly that holds an object such as a rod receiver for a fishing rod in a desired orientation that is manually and singlehandedly adjustable about the horizontal and/or vertical axes. The rod holder assembly can be set to lock in positional orientation or clutch in response to an external force, A method for using the rod holder assembly is also described.

14 Claims, 10 Drawing Sheets

(56) References Cited

U.S. PATENT DOCUMENTS

| | | | | |
|---|---|---|---|---|
| 2,360,402 A * | 10/1944 | Determan | A01K 97/10 | 248/514 |
| 2,552,639 A * | 5/1951 | Menegay | A01K 97/10 | 248/207 |
| 2,576,212 A * | 11/1951 | Carter | A01K 97/10 | 248/516 |
| 2,618,496 A * | 11/1952 | Johnson | E04G 5/02 | 16/19 |
| 2,680,924 A * | 6/1954 | Menegay | A01K 97/10 | 248/516 |
| 2,694,538 A * | 11/1954 | Consolo | A01K 97/10 | 248/182.1 |
| 2,851,234 A * | 9/1958 | Scheifele | A01K 97/10 | 248/538 |
| 3,034,798 A * | 5/1962 | Portz | A01K 87/08 | 279/42 |
| D202,353 S * | 9/1965 | Wester | | 248/514 |
| 3,212,740 A * | 10/1965 | Greenberg | A01K 97/10 | 248/514 |
| 3,290,816 A * | 12/1966 | Eklof | A01K 97/10 | 248/516 |
| 3,425,657 A * | 2/1969 | Doyle | B60R 1/04 | 248/481 |
| 3,519,236 A * | 7/1970 | Schmidt | F16M 11/14 | 248/181.1 |
| 3,783,547 A * | 1/1974 | Bystrom | A01K 97/10 | 248/516 |
| 3,792,829 A * | 2/1974 | Fickett | A01K 97/10 | 248/229.15 |
| 3,841,769 A * | 10/1974 | Bowerman | B60R 1/06 | 248/478 |
| 4,222,680 A * | 9/1980 | Browning | A45B 17/00 | 403/133 |
| 4,620,813 A * | 11/1986 | Lacher | F16C 11/106 | 248/182.1 |
| 4,681,056 A * | 7/1987 | Friedle | B63H 20/12 | 114/144 R |
| 4,699,347 A * | 10/1987 | Kuhnley | A47G 33/1213 | 248/230.8 |
| 4,827,654 A * | 5/1989 | Roberts | A01K 97/10 | 248/514 |
| 5,009,027 A * | 4/1991 | Lee | A01K 97/10 | 248/533 |
| 5,054,737 A * | 10/1991 | DeLancey | A01K 97/10 | 248/515 |
| 5,435,473 A * | 7/1995 | Larkum | B60R 9/08 | 211/4 |
| 5,761,844 A * | 6/1998 | Horschel | A01K 97/10 | 248/131 |
| 5,845,885 A * | 12/1998 | Carnevali | F16M 11/14 | 248/181.1 |
| RE36,550 E | 2/2000 | West | A47G 29/1216 | 248/183.1 |
| 6,019,341 A * | 2/2000 | Brown | A47G 33/1213 | 248/516 |
| 6,052,937 A * | 4/2000 | Morong | A01K 97/10 | 43/21.2 |
| 6,109,815 A * | 8/2000 | Merlo | F16C 11/106 | 403/103 |
| 6,217,249 B1 * | 4/2001 | Merlo | F16C 11/0604 | 403/128 |
| 6,494,635 B1 * | 12/2002 | Merlo | F16C 11/106 | 403/103 |
| 6,561,476 B2 * | 5/2003 | Carnevali | F16M 11/14 | 248/181.1 |
| 6,581,892 B2 * | 6/2003 | Carnevali | F16C 11/0604 | 248/181.1 |
| 6,591,541 B1 * | 7/2003 | Cummings | A01K 97/10 | 248/514 |
| 6,702,502 B1 * | 3/2004 | Graber | F16C 11/0638 | 384/283 |
| 6,767,153 B1 * | 7/2004 | Holbrook | F16C 11/0604 | 403/115 |
| 6,866,685 B2 * | 3/2005 | Chan | A61F 2/30771 | 623/22.17 |
| 6,974,113 B1 * | 12/2005 | Clark | A01K 97/10 | 248/521 |
| 7,025,315 B2 * | 4/2006 | Carnevali | F16C 11/0604 | 248/181.1 |
| 7,114,281 B2 * | 10/2006 | Miller | A01K 97/10 | 43/21.2 |
| 7,156,358 B2 * | 1/2007 | March | B60R 1/04 | 248/481 |
| 7,296,377 B2 * | 11/2007 | Wilcox | A01K 91/08 | 114/255 |
| 7,320,450 B2 | 1/2008 | Carnevali | | |
| D564,062 S * | 3/2008 | Carnevali | | D22/147 |
| D573,686 S * | 7/2008 | Marcus | | D22/147 |
| D574,920 S * | 8/2008 | Marcus | | D22/147 |
| 7,588,384 B2 * | 9/2009 | Yokohara | F16C 11/068 | 184/5 |
| 7,774,973 B2 * | 8/2010 | Carnevali | A01K 97/10 | 248/276.1 |
| 7,849,630 B2 * | 12/2010 | Carnevali | A01K 97/10 | 43/21.2 |
| RE42,581 E * | 8/2011 | Carnevali | F16M 11/14 | 248/181.1 |
| 7,996,917 B2 * | 8/2011 | Prendergast | G02B 23/125 | 2/410 |
| 8,132,291 B2 * | 3/2012 | Tsai | F16C 11/0604 | 16/224 |
| 8,453,300 B1 * | 6/2013 | Michnik | B25G 3/32 | 16/422 |
| 8,608,120 B2 * | 12/2013 | Chen | F16M 11/043 | 403/90 |
| 8,616,800 B2 * | 12/2013 | Abe | F16C 11/068 | 403/139 |
| 8,960,629 B2 * | 2/2015 | Rizk | F16M 11/14 | 248/481 |
| 9,188,280 B2 * | 11/2015 | Congdon | F16M 11/14 | |
| 9,615,564 B2 * | 4/2017 | Liney | A01K 97/10 | |
| 10,258,026 B2 * | 4/2019 | Thomas | A01K 97/10 | |
| 10,426,153 B2 * | 10/2019 | Thomas | A01K 97/10 | |
| 2004/0130105 A1 * | 7/2004 | Chen | B23B 31/008 | 279/42 |
| 2006/0000957 A1 * | 1/2006 | Carnevali | F16M 11/14 | 248/181.1 |
| 2009/0211141 A1 * | 8/2009 | Marcus | A01K 97/10 | 43/21.2 |
| 2019/0191687 A1 * | 6/2019 | Thomas | A01K 97/10 | |

* cited by examiner

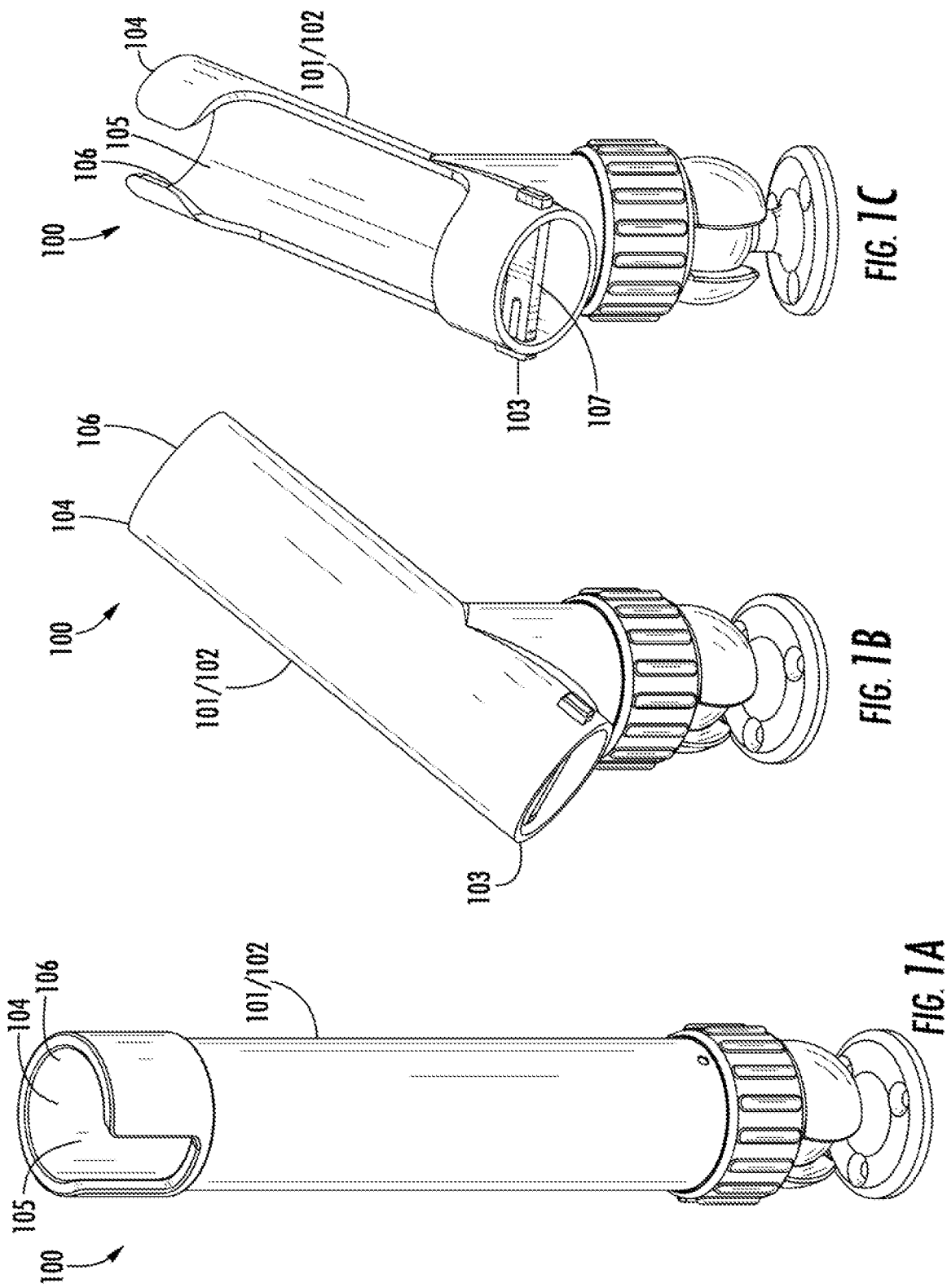

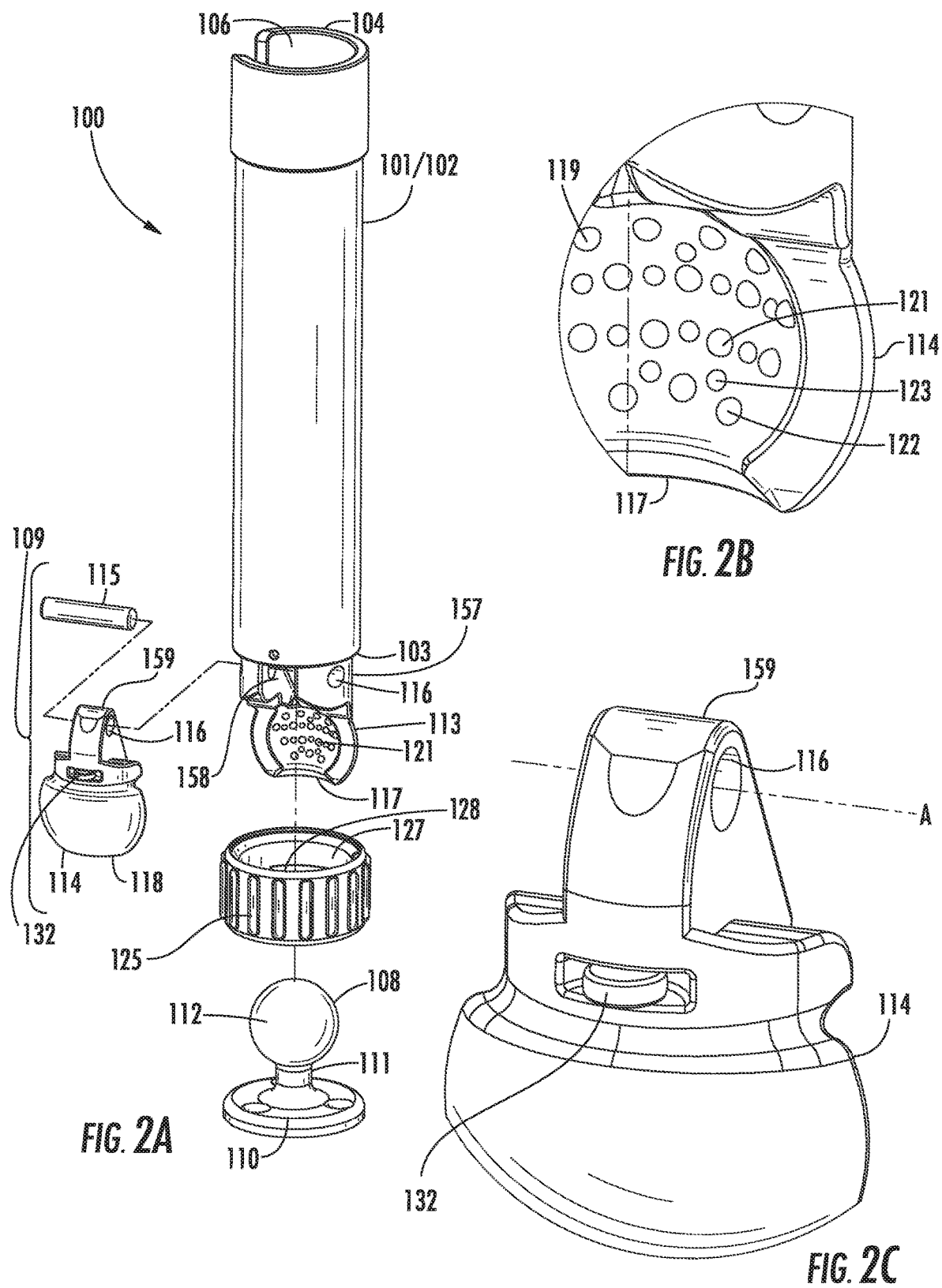

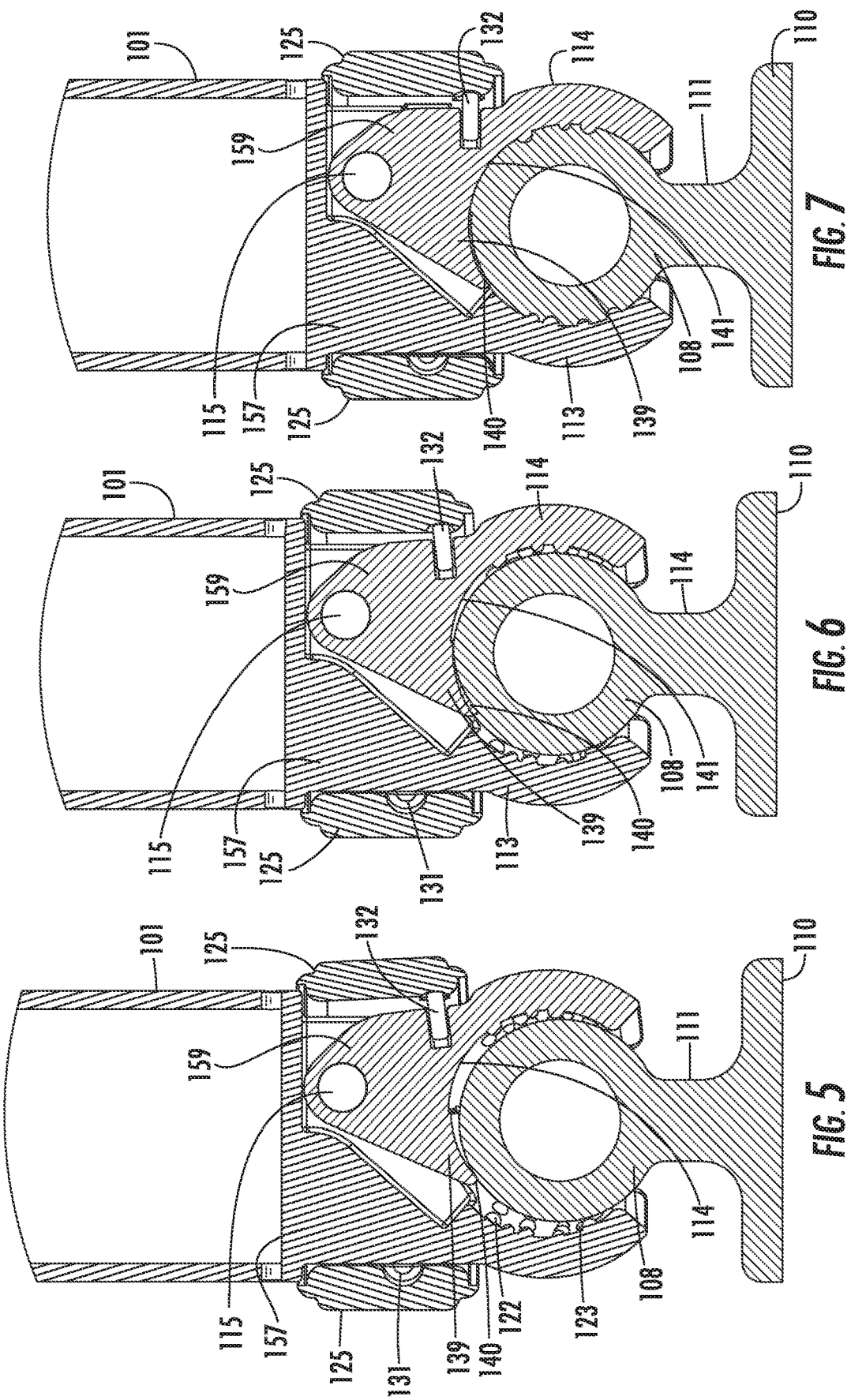

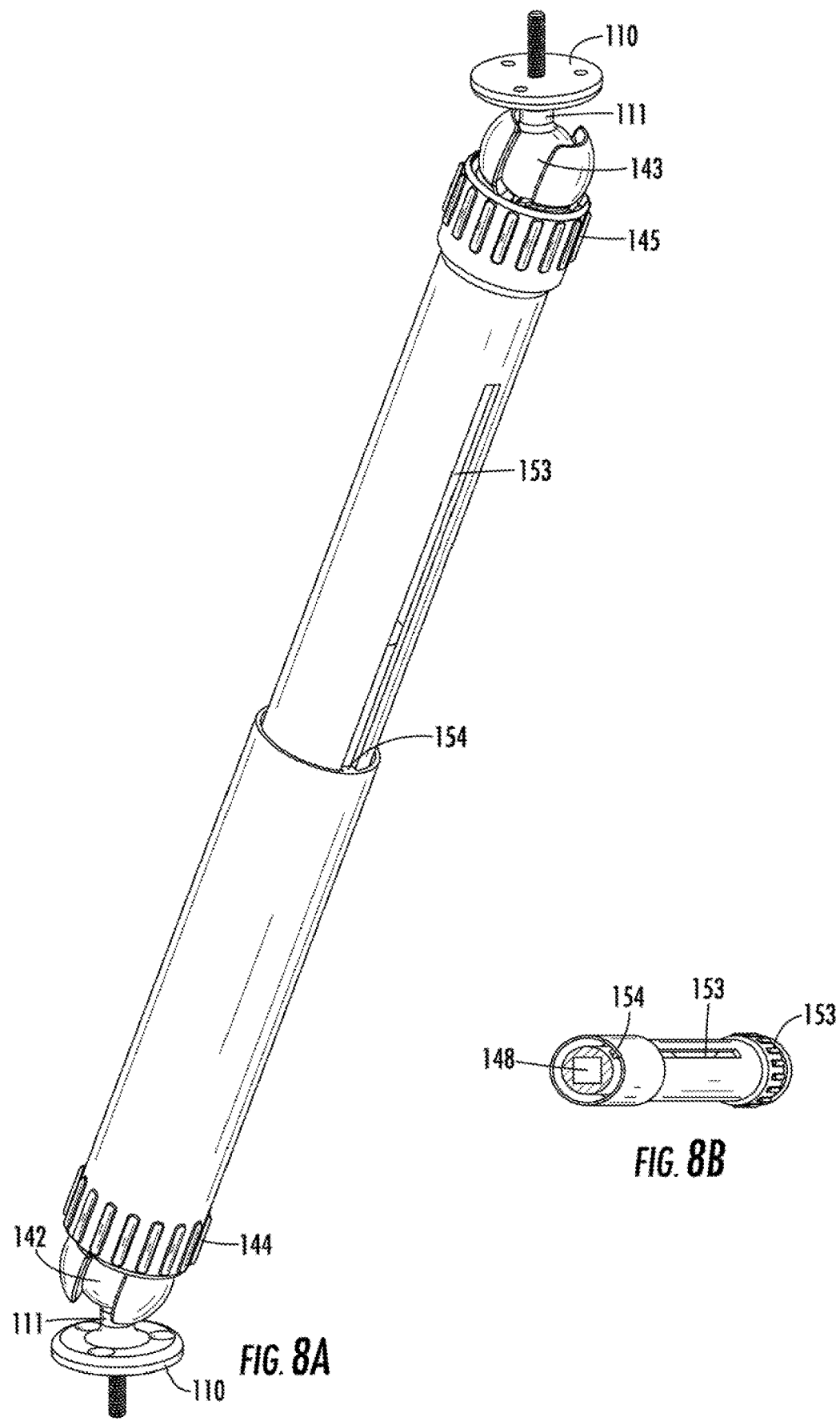

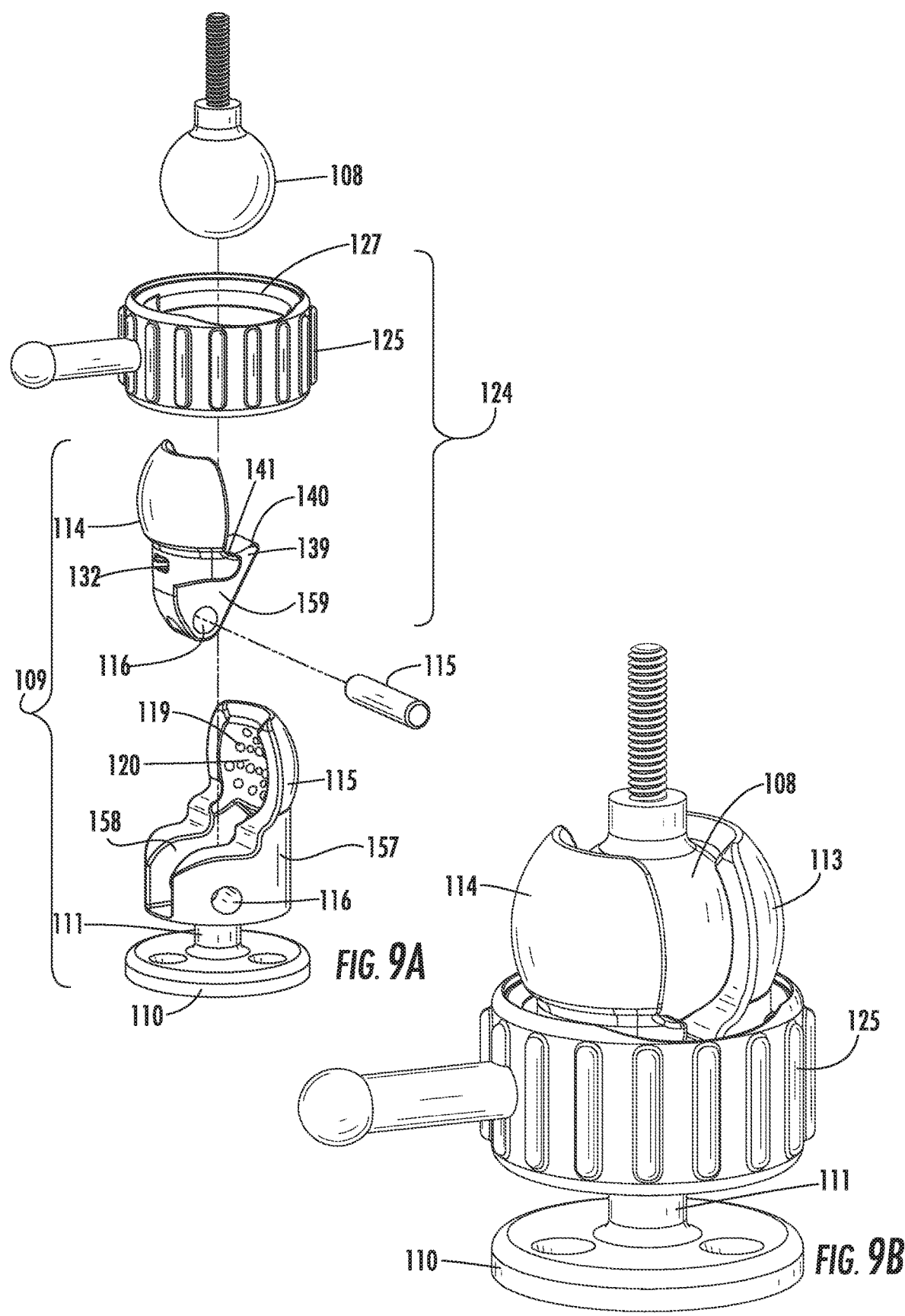

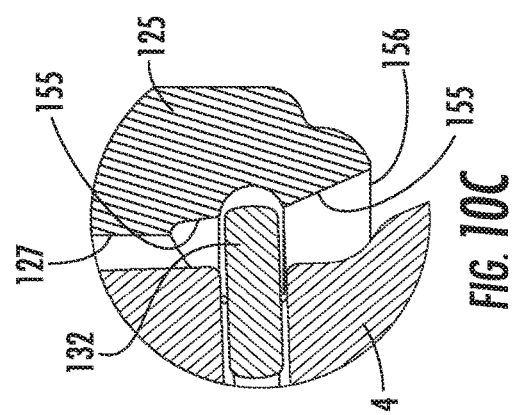
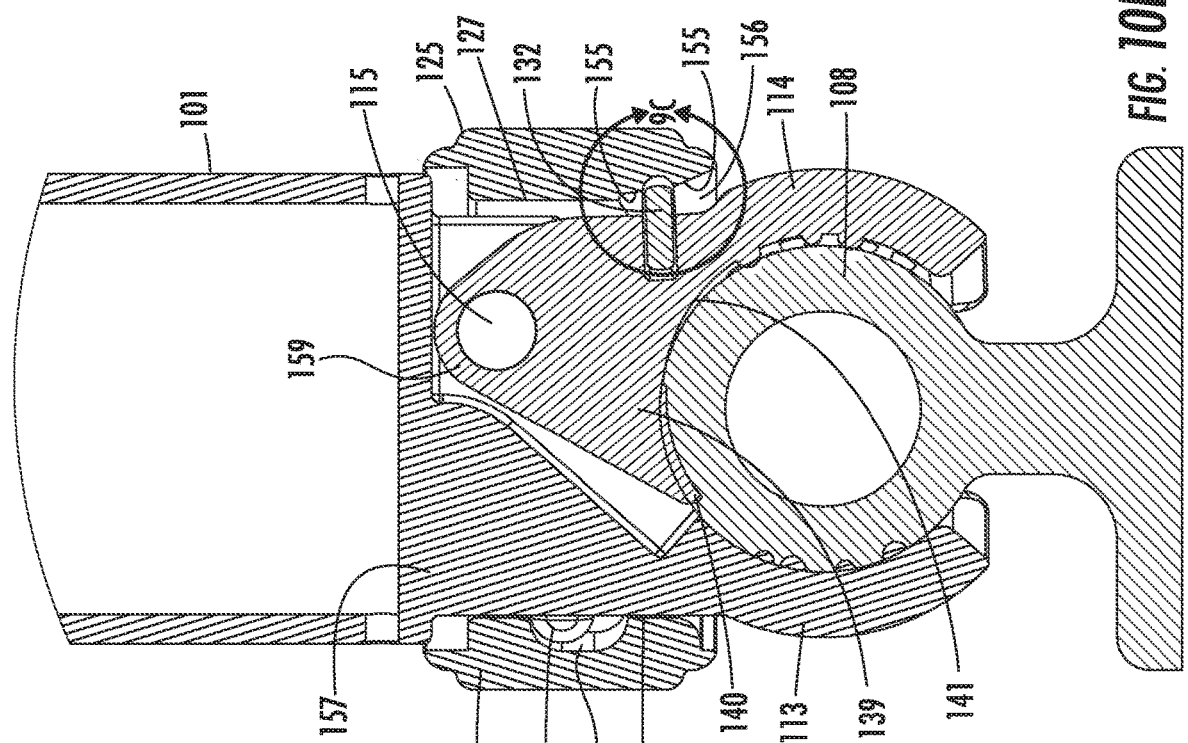
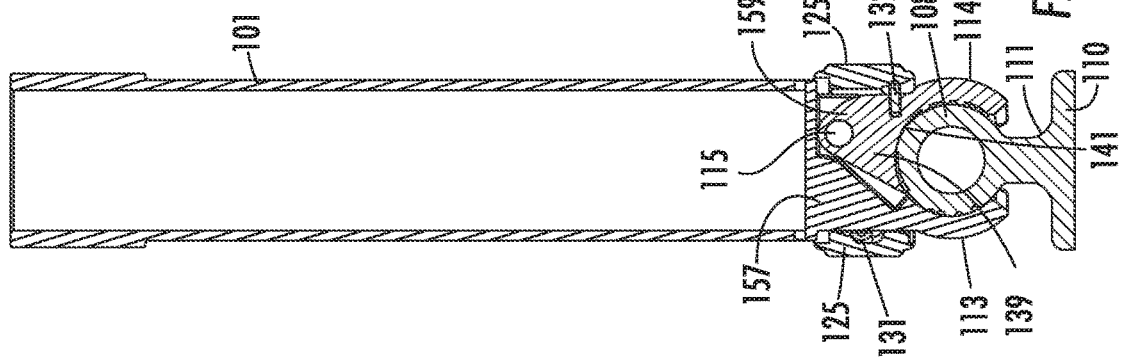

ROD HOLDER ASSEMBLY AND METHOD OF USING THE SAME

CROSS REFERENCE TO RELATED APPLICATIONS

This application claims priority to U.S. Provisional Patent Application Ser. No. 62/177,239 filed Mar. 8, 2015. The disclosure of Application Ser. No. 62/177,239 is incorporated by reference herein in its entirety.

FIELD

Herein described is a rod holder assembly that holds an object such as a rod receiver for a fishing rod in a desired orientation and methods of using the same. The assembly may be singlehandedly adjusted about vertical and/or horizontal axes via substantially synchronous movements. The rod holder assembly described herein may be used to mount other objects as well.

BACKGROUND

While the principles discussed below address rod holders, they are equally applicable to assemblies used to mount other objects such as cameras, radios, spot lights and the like. Fishing is a popular activity frequently enjoyed on the water in watercraft of some form. The types of watercraft used for fishing is diverse and includes stand-up paddle boards, sea kayaks, canoes, and, of course, traditional open hulled motorized vessels of all sizes. Anglers who prefer to fish from watercraft have employed a variety of ways to secure their fishing rods while traveling from point to point or while fishing thereby freeing up hands to perform other tasks. For example, rod holders have been used in such a manner for many years and, depending on the vessel's design, there are many structures, surfaces, and other features that may serve as potential mounting locations for rod holders. Vertical and horizontal rails, flat surfaces such as decks and gunwales, and mounting tracks arranged on the decks are all possible mounting locations for rod holders.

As mentioned above, manually adjustable rod holders are known in the art but lack efficiency, convenience, and ease in adjustability. For example, they typically require two hands to operate and lock in position as the user manually holds the rod holder at the desired angle with the one hand and simultaneously manipulates tensioning thumb screws or the like with the other. Traditionally, two hands are required because loosening the holding screw in order to adjust rod holder position removes the friction or disengages the gears holding the rod holder in place leaving the rod holder free to move about the adjustment axis and/or fall in the direction of gravity or other forces if not held securely in place during adjustment operation. This unwanted motion could result in the rod falling out of the rod holder.

Some current rod holders use a spherical base to facilitate changes in rod holder orientation; however, attachment/detachment of the rod holders to the base as well as adjustment of orientation may be quite cumbersome due to the mechanisms employed. Frequently these mechanisms involve screws or knobs to loosen and tighten requiring the user to guess the amount of cranks/rotations on the screw needed to secure the holder in place. Obviously, a rod holder that is not properly secured may result in unwanted slippage or total failure. This characteristic may be amplified in wet environments where the user sometimes must apply greater force to the screw or knob to hold the rod holder in position and avoid slippage. This in turn may result in over tightening and permanent deformation and/or cracking of the spherical ball base.

Therefore, an adjustable assembly for holding fishing rods and other objects that has one or more of the following features is desired: doesn't rely on screw adjustment to secure the object (e.g., rod receiver) in positional orientation, provides a positive mechanical positional lock, can clutch or slip in response to significant external force or torque, is adapted for ambidextrous single handed operation, requires no guessing needed to lock the object into positional orientation, allows for binary adjustability to clutch and lock positions, and is adapted such that a single handed motion can install, lock, set the clutch, reposition and remove the rod holder or other attached component.

SUMMARY

The present invention is directed to a rod holder assembly for holding a rod or other mountable object in a desired orientation that is manually and singlehandedly adjustable about the vertical axis and is capable of different tension settings allowing for a degree of slippage in response to desired range of external forces or, alternatively, substantially no rotational slippage. In one embodiment, the rod holder assembly can comprise a rod receiver which, in some embodiments, is substantially tubular or cylindrically shaped. The rod receiver can receive most of, if not all of, the handle of contemporary fishing rods. In one embodiment, the assembly does not include a rod receiver, but another object for mounting such as a camera, radio, spot light, etc.

In one embodiment, the rod holder assembly can include a rod receiver or other object for mounting, a base, a clamp assembly, and a locking assembly. Multiple rod receiver models can be used for the purposes of this invention including, for example, bait caster, rocket launchers, and the like.

Rod holder assembly can include a base. In one embodiment, base can be substantially spherical in shape and include one or more depressions or protrusions about its exterior surface. In another embodiment, the depressions are substantially equidistant from one another and evenly distributed (e.g., equidistant) about the exterior surface of base. In yet another embodiment, base exterior surface can be substantially geodesic. Likewise the exterior surface of the base can be smooth with no texture.

Rod holder assembly can include a clamp assembly with one or more clamping arms. In one embodiment, the clamp assembly includes a fixed clamping arm and a pivoting clamping arm. Clamping arms can contain interior surfaces that conform to the spherical profile of the base. The interior surfaces of clamping arms can furthermore contain one or more depressions or protrusions that complement or mate in close communication with corresponding depressions or protrusions on base exterior surface. Clamping arms additionally can be funnel shaped at the bottom end to facilitate base entry into the clamp assembly. Clamping arms can further contain a flange for engagement with the base's upper exterior surface. Fixed clamping arm can be an integral part of rod receiver and pivoting clamping arm can be pivotally engaged to fixed clamping arm via pin or the like.

Rod holder assembly can include a locking assembly. In one embodiment, locking assembly can contain a collar that can be an integral component of rod receiver or can be separate and independently assembled. Fixed clamping arm and/or pivoting clamping arm can contain one or more tabs for interaction with collar, for example, positioned on the exterior surface of the clamping arms. Collar can contain one or more grooves on its interior surface which engage the one or more tabs to serve as guides for tabs about the horizontal or vertical axes. Grooves can be sloped or stepped (with depressions at predetermined locations and at predetermined depths) to facilitate adjustment of clamping arms about base, locking clamping arms about base, or allow clamping arms to clutch (slip) in response to external forces such as a powerful fish strike or pressure applied by the user to forcefully adjust the orientation. Grooves can be different designs such as coiled, linear, or "L" shaped. Collar can be rotated about upper portion of clamp assembly facilitating travel of tabs through grooves.

Rod holder assembly can be double ended and extendable containing two clamping assemblies and two locking assemblies. In one embodiment, the two collars can be engaged to one another such that rotation is coordinated (i.e., one cannot be rotated independently of the other) but the rod holder assembly itself is extendable. Likewise, the two clamping assemblies can be engaged such that the clamping arms remain in a fixed orientation, but also extendable with the rest of the rod holder assembly. In one embodiment, collars can include elongated tubular elements that engage one another in telescoping fashion wherein one tubular element slides within the other tubular element. In another embodiment, elongated tubular elements can be fluted to facilitate coordinated rotation of both collars. In yet another embodiment, elongated tubular elements can include a slot/tab assembly to facilitate coordinated rotation of both collars. The two collars can include grooves that have reversed or opposite orientations to facilitate tightening, clutching, and locking functions about a base at both ends of the rod holder assembly.

BRIEF DESCRIPTION OF THE DRAWINGS

Embodiments of the invention will now be described, by way of example, with reference to the accompanying drawings, in which:

FIG. 1A-C illustrates perspective views of fully assembled exemplary rod holder assemblies with different rod receivers.

FIG. 2A-F illustrates an exploded view of an embodiment of a rod holder assembly including the fixed clamping arm, pivoting clamping arm, and the locking assembly.

FIG. 5 illustrates a cross sectional view of an embodiment of a rod holder assembly in its initial engagement with base.

FIG. 6 illustrates a cross sectional view of an embodiment of a rod holder assembly in a clutch setting.

FIG. 7 illustrates a cross sectional view of an embodiment of a rod holder assembly in locked setting.

FIG. 8A-C illustrates an embodiment of a double ended rod holder assembly.

FIG. 9A-B illustrates an embodiment of a rod holder assembly with inverted components.

FIG. 10A-F illustrates an embodiment of a rod holder assembly with cross sectional views of the locking and clamping assemblies and a cross sectional view of the collar.

Like reference numerals refer to like parts throughout the various views of the drawings.

DETAILED DESCRIPTION

Figure 2D:
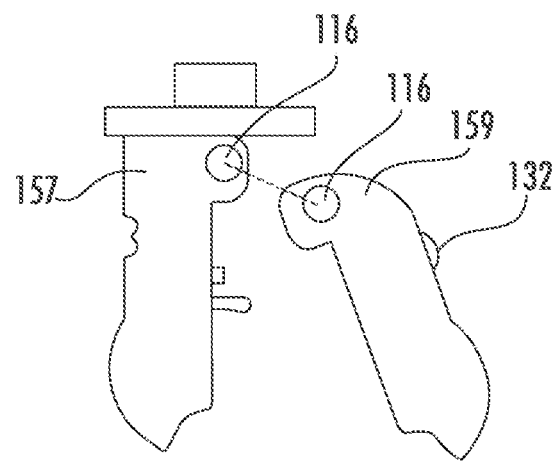

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "first," "second," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

It should be noted that although the discussions herein may refer to a specific order and composition of method steps, it is understood that the order of these steps may differ from what is described. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on designer choice and it is understood that all such variations are within the scope of the invention.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112.

Figure 2E:
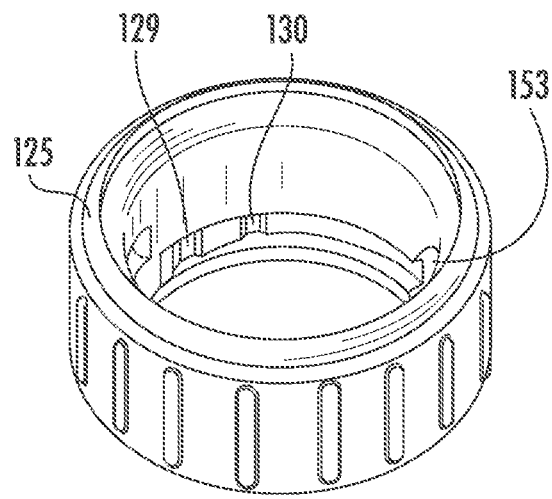
Figure 2F:
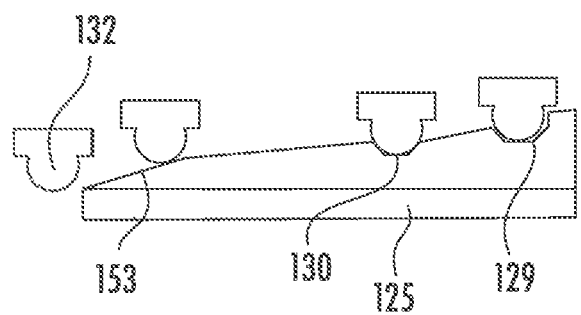
Figure 3:
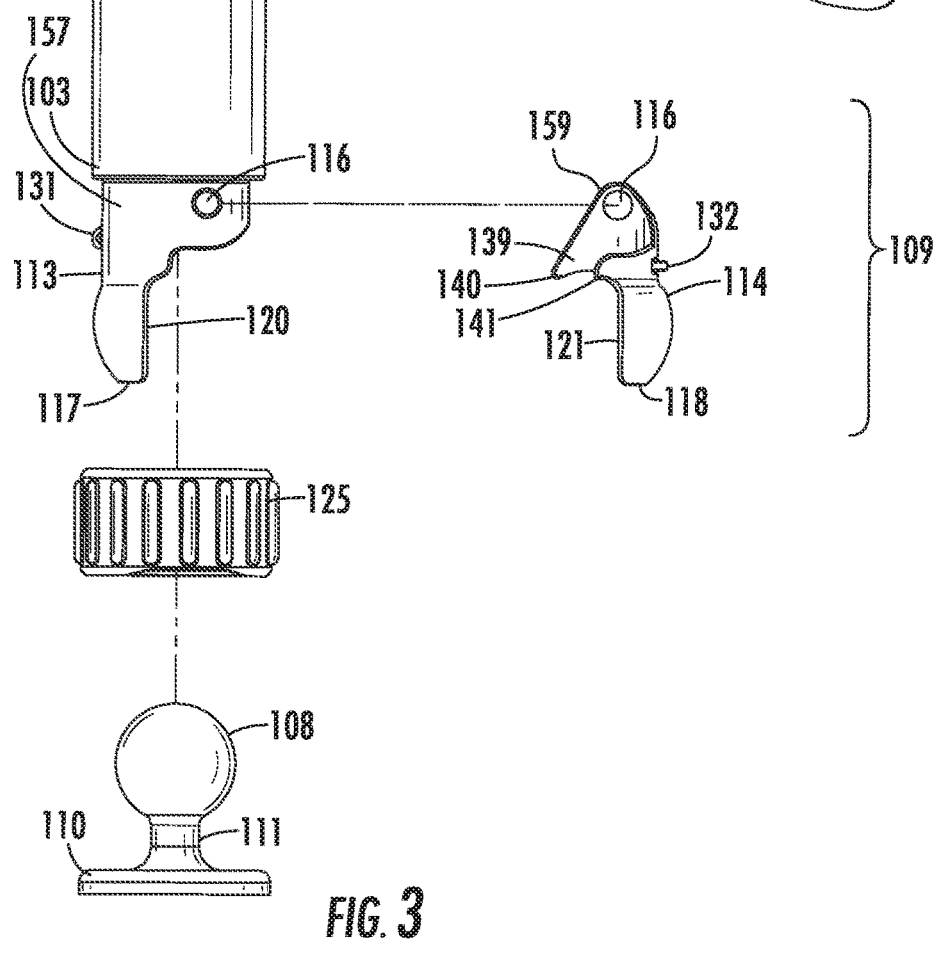
FIG. 3 illustrates an exploded view of an embodiment of a rod holder assembly.

Referring now to FIGS. 1-3, an adjustable rod holder assembly 100 is shown. In one possible embodiment, the rod holder assembly 100 receives a fishing rod and a user manually adjusts the rod holder assembly to a desired orientation. The user may make said adjustments using one hand and synchronous motion. In some embodiments, once the desired orientation has been achieved, the rod holder assembly 100 may be set to allow the angle to slip and change in response to sufficient torque from an external force or alternatively the rod holder assembly may be substantially locked in place such that the angle is virtually unchanged upon application of similar torque on the components.

Referring now to FIG. 1, the rod holder assembly 100 may comprise a rod receiver 101 for receiving and supporting a fishing rod. In the embodiment depicted in FIG. 1A, rod receiver 101 comprises a cylindrically shaped tube 102 having a distal end 103, a proximal end 104, a cavity 105, and an opening 106. Those of skill in the art will understand that rod receiver 101 may be sized and dimensioned to receive various types and sizes of fishing rods.

In one embodiment, a fishing rod may be telescopically inserted into opening 106 of distal end 103 of rod receiver 101—handle end first. Rod receiver 101 may be sized to form a snug fit around the fishing rod handle or, alternatively, rod receiver cavity 105 may be sized such that a gap exists between the exterior surface of the rod handle and the interior surface of cavity 105. Suitable materials for the rod receiver 101 may include, without limitation, a rigid polymer, polyvinyl chloride, polyurethane, a metal, rubber, and wood. Rod receiver 101 may be equipped with an insert 107 that, in some embodiments, supports the handle of a fishing rod or other object to avoid interference with other components. Various well known rod receiver models can be used for the purposes of this invention, for example rocket launchers, bait caster cradles, and the like.

As stated previously, rod holder assembly 100 may be adjustable so that the user may point rod receiver 101 and thus the fishing rod itself as desired along a 360 degree arc about a vertical axis. In some embodiments, the user may adjust the rod holder assembly 100 by tilting the rod receiver 101 to a desired orientation in relation to a horizontal axis (e.g. deck surface, water surface).

With reference to FIGS. 1-3, manual manipulation or adjustment of the rod receiver about the vertical and/or horizontal axes may be carried out by elements including at least one substantially spherical base 108 and at least one clamp assembly 109. In the embodiment shown in FIG. 2, the substantially spherical base 108 may be mounted to or affixed to a support or platform 110 which itself is mounted and secured to a desired surface via mounting elements such as screws or the like. In the embodiment depicted in this figure, base 108 is mounted to support 110 by post 111. Base 108 can have various mounting configurations as needed to attach to a boat deck or other surface. With reference to FIG. 9A-B, base 108 and clamp assembly 109 can be swapped. For example, clamp assembly 109 can be supported by platform 110 and the substantially spherical base 109 can be affixed to other objects (e.g. fish finder, radio, phone) through an accessory object support 160, such as a bolt for example. The object can be attached to or an integral part of the extension of the base. Base 108 can be composed of various materials such as, for example, hard materials (e.g. plastics) or a hard inner core with a pliable outer shell (e.g. rubber).

Referring now to the embodiment illustrated in FIGS. 1-10, substantially spherical base 108 is smooth about its exterior surface 112. However, in alternative embodiments, exterior surface 112 can contain a pattern of depressions. For example, depressions can cover all or substantially all of exterior surface 112 or a portion of exterior surface 112. Said depressions can be arranged substantially equidistant from one another and can be substantially spherical in shape or another geometric shape as long as their intended purpose is achieved by the design. Likewise, base 108 exterior surface 112 can be geodesic as an alternative to depressions or, as described above, exterior surface 112 can be smooth with no features.

Figure 4:
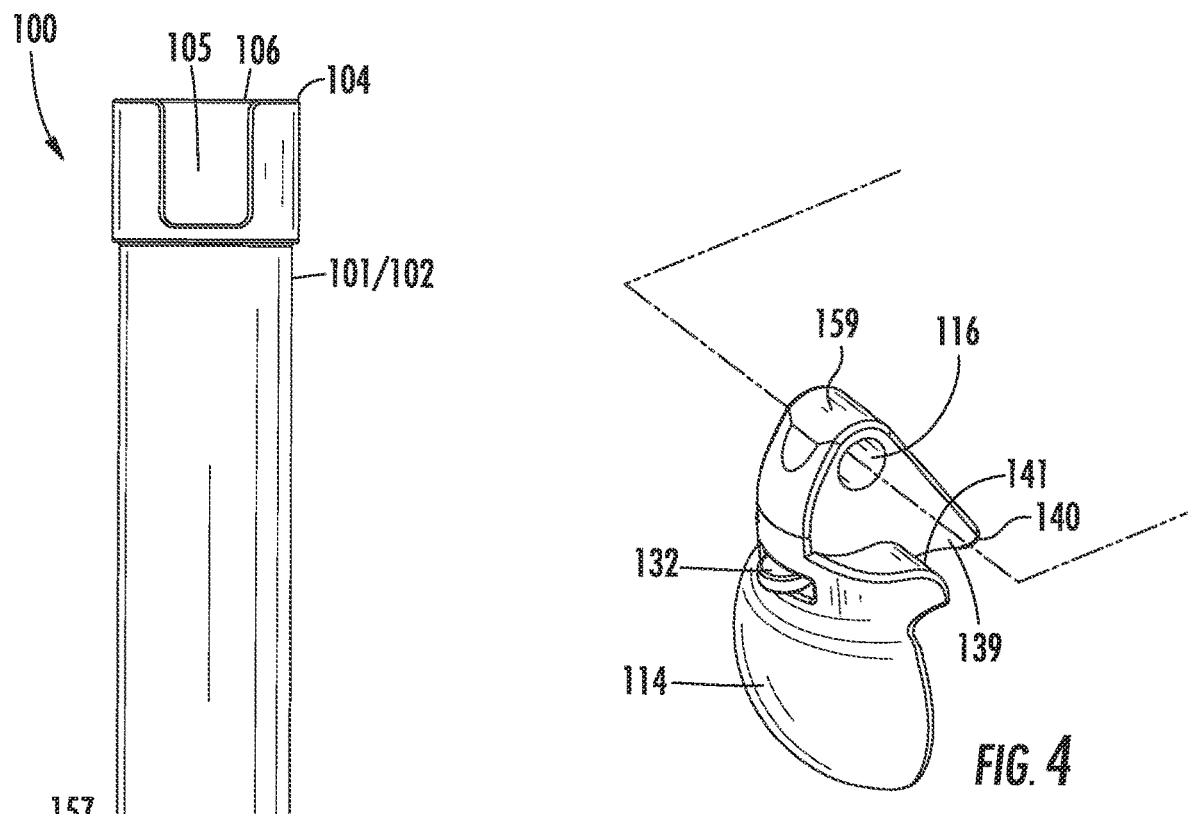
FIG. 4 illustrates an embodiment of a pivoting clamping arm.

Referring now to the embodiments illustrated in FIGS. 2-4, rod holder assembly can be configured with a clamp assembly for securing said receiver 101 to said base 108. In the embodiment illustrated in FIGS. 3-4, said clamp assembly comprises two clamping arms, a fixed clamping arm 113 that, in the embodiment shown in FIG. 3, can be stationary and permanently affixed to said rod receiver 101 (or other mountable object) and a pivoting clamping arm 114 that can be pivotably secured to said fixed clamping arm 113 by pin 115 or the like. Referring to the embodiment illustrated in FIG. 2A-C, fixed clamping arm 113 further comprises a tubular portion 157 which, in the embodiment shown in FIG. 2A-C, is the part of the fixed clamping arm 113 that is integral to the end of rod receiver 101. The tubular portion 157 comprises a slot 158 for engagement with the pivoting clamping arm 114. Pivoting clamping arm 114 further comprises a pivot head portion 159 that pivotably engages slot 158 in tubular portion 157 of fixed clamping arm 113. When pivot head portion 159 is correctly placed within slot 158 of tubular portion 157 of fixed clamping arm 113, the components form a channel 116 through which a pin 115 may be inserted to secure pivoting clamping arm 114 to fixed clamping arm 113 to facilitate pivotal motion of pivoting clamping arm 114 about axis A. In another embodiment, both clamping arms may be pivoting. In yet another embodiment, multiple pivoting clamping arms can be configured radially about the base 108 and for engagement therewith.

Referring now to the embodiment shown in FIG. 9, the orientation of the various components of the assembly can be inverted such that, for example, the base is affixed to the object to be mounted and the clamping/locking assemblies or components thereof are affixed to and supported by a stationary support structure such as a boat deck, boat rail or the like.

In one embodiment, fixed clamping arm 113 can be mechanically attached to rod receiver 101 rather than an integral component of rod receiver 101 as described above. For example, fixed clamping arm 113 may be attached to rod receiver 101 by retention element (not shown in Figures) (e.g. screw) through a hole in the bottom of rod receiver 101. In one embodiment in which fixed clamping arm 113 is attached to rod receiver 101 by retention element, the various components (rod receiver, clamp assembly, and collar) are allowed to rotate independently of one another. Other mechanical structures may be used to accomplish this independent rotary movement of components as well as limited vertical movement of the collar. For example, the upper end of the fixed clamping arm 113 can incorporate an extension with catches that deflect or flare outward from an insert hole upon insertion into the rod receiver 101 and collar (described below) preventing the fixed clamping arm 113 from backing out of the rod receiver 101 and collar but still allow rotation within. In this embodiment, pivoting clamping arm 114 attaches to and functions with the fixed clamping arm 113 in the same fashion as described above.

In one embodiment, receiving ends 117, 118 of clamping arms 113 and 114 can be designed to promote base 108 entry into clamp assembly 109 without having to bias one of the clamping arms in an open position with, for example, a spring and the like. For example, in one embodiment, receiving ends 117, 118 form a substantially funnel shape when in a closed position. As the clamping assembly 109 is lowered onto base 108, the pressure forces pivoting clamping arm 114 slightly open and the slope of the substantially funnel shape promotes proper positioning of the base 108 within clamping assembly 109. In another embodiment, a bumper can be affixed on either clamping arm to slightly bias the clamping arms apart to promote base 108 entry.

In one embodiment, fixed clamping arm 113 and/or pivoting clamping arm 114 can contain protrusions 119 about their interior faces 120 and 121. In embodiments that contain depressions arranged about exterior surface of base 108, said protrusions can be designed and arranged to substantially mate with corresponding depressions on base 108 when fixed clamping arm 113 and pivoting clamping arm 114 are tightened about base 108 to secure rod receiver 101 thereto. Interior faces 120 and 121 can be cupped and concave, so long as they substantially conform to exterior surface 112 of base 108 when engaged thereto.

In the embodiment shown in FIG. 2A-B, interior faces 120 and 121 contain protrusions which interact with a substantially smooth exterior surface 112 of base 108. Protrusions can be different heights, sizes and shapes. Interior faces 120, 121 of clamping arms 113, 114 can have at least two protrusion configurations (arrangement, dimensions, shape) in different regions of the face. For example, the interior faces 120, 121 of clamping arms 113, 114 shown in FIGS. 5-7 contain a large protrusion set and a small protrusion set for clutching and locking functions. In the clutching position, the large protrusion set 122 engages the exterior surface of base 108 and in the locking position the small protrusion set 123 and large protrusion set 122 engage exterior surface 112 of base 108. In one embodiment, the large protrusions have a large profile compared to the small protrusions which provides a small angle of interface between the large protrusion and, for example, a soft or malleable base, facilitating slippage in clutch configuration. When the rod holder assembly in full lock position and both large and small protrusion are in contact with base, a soft or compressible base can be deformed about the large and small profile protrusions. Engagement about the small profile protrusions forms an interface angle where there is direct radial interference and greater hold.

In embodiments comprising matching protrusions and depressions, protrusions can be substantially equal in size and shape to depressions. Alternatively, protrusions can be smaller in size than depressions. Protrusions also can be randomly offset from the center of the mating depressions to maximize gripping capacity by optimizing contact between surfaces. Furthermore, depressions and protrusions can be swapped between exterior surface 112 of base 108 and interior surfaces 120, 121 of clamping arms 113 and 114. Protrusions can be substantially spherical or cylindrical in shape. Other geometric shapes can be used as long as their intended purpose is achieved by the design and secure engagement between clamping arms 113, 114 and base 108 is achieved when clamping arms are tightened about the base and disengage easily when clamping arms are released.

The physical dimensions (e.g., shape, height, depth) of protrusions (and depressions) can be more pronounced, for example, when base 108 is made of a soft, flexible (e.g. rubbery) material. In another embodiment, the physical dimensions of protrusions (and depressions) can be variable within specific regions of interior surfaces 120, 121 of clamping arms 113, 114 and exterior surface 112 of base 108. For example, the length and depth of protrusions and depressions can be less pronounced about the outside region of the clamping arm interior surface and more pronounced toward the center of the clamping arm interior surface. In the embodiment illustrated in FIGS. 5-7, both clamping arms have protrusions on the interior surface 120, 121; however, either the fixed clamping arm, the pivoting clamping arm, or both may possess depressions and/or protrusions as it only takes one side to accomplish the locking function between base 108 and the clamping assembly 109.

In one embodiment, rod holder assembly 100 includes a locking assembly 124 for adjusting and securing clamping arms to base 108. Locking assembly 124 can be designed such that it clutches or slips in response to a desired torque range allowing a change in the rod receiver's (and fishing rod) orientation in relation to the vertical axis if sufficient torque is applied to the rod. Locking assembly can also be locked rigidly in place such that little to no slip is allowed in response to torque.

Referring now to the embodiments shown in FIGS. 1-10, locking assembly 124 can include a collar 125 which can be manipulated (up and down motion and rotational motion) to facilitate inward pressure on clamping arms 113, 114 to close and clutch or lock the clamping arms about base 108 once base 108 is properly positioned within them. In one embodiment, collar 125 is an independent structure that can be assembled or added to the other components, for example, by fully closing the clamping arms 113, 114 and slipping the collar over and upward toward the rod receiver 101. The collar can be positioned about upper portion of clamping arms 113, 114 and interact with said clamping arms to achieve locking, clutching, or release functions. In its upper position, collar allows pivoting clamping arm 114 to open sufficiently wide for base 108 insertion. In an alternative embodiment, collar 125 can be an integral component of rod receiver 101 which may be more suitable in association with a fixed clamping arm 113 that is attached to rod receiver 101 via retainer as described above.

In one embodiment, collar 125 can be pushed downward to force the closure of the clamping arms about base 108 and then rotated to adjust the pressure on the clamping arms and likewise the clamping arms pressure on base 108. In one embodiment, a tab 132 can be positioned on exterior surface of pivoting clamping arm 114. Suitable tabs can be substantially rounded in shape, retractable, and/or spring activated. In one embodiment, said tab can be a bearing. Within the interior surface or wall 127 of collar 125 can be a slot or grove 128 that engages 132 allowing 132 to travel through said groove 128 as collar 125 is rotated. In another embodiment, 132 and groove 128 can switch positions whereby 132 is a part of collar 125 and groove 128 is a part of the clamping arm. Groove 128 can be sloped such that as collar 125 is rotated and 132 travels through groove 128, pressure on pivoting clamping arm 114 is increased and likewise pressure on base 108. In one embodiment, in order to facilitate engagement of 132 with groove 128, groove 128 is designed such that as collar 125 is maneuvered downward (prior to rotation of the same) by user 132 comes to rest within groove 128, for example, via communication with the ramped or sloped feature 155 within the groove. Thereafter, as collar 125 is rotated by user, 132 travels along grove 128 and the pivoting clamping arm 114 is forced inward progressively applying pressure to base 108. It should be recognized that collar 125 can incorporate various mechanical structures to facilitate user manipulation such as, for example, a textured exterior surface and/or extension elements, such as a handle or thumb lever.

Rod holder assembly 100 can include stop (not shown in Figures) for proper vertical alignment and positioning of base 108 within clamp assembly 109. In one embodiment, stop can be an integral component of fixed clamping arm 113 such that when the user pushes clamp assembly onto base 108 to attach the rod receiver 101, the top of base 108 contacts stop preventing further vertical movement and aligning the clamp assembly at the proper vertical position to close about the base 109. Stop can be a rigid molded plastic extension affixed to or an integral component of interior surface 127 of either clamping arm.

In one embodiment, groove 128 can include a lock position depression 129 located along its travel path, which is used to lock collar 125 into place at a predetermined point and depth configured to lock the pivoting clamping arm 114 about base 108. Groove 128 can also include a clutch position depression 130 prior to (or after) lock position depression 129 and at a depth to achieve sufficient pressure on the clamping arms 113, 114 about base 108 to allow slippage under a desired amount of pressure. It should be understood that multiple grove patterns, depressions, and slopes are contemplated to achieve variable clamping pressures about base 108.

In one embodiment, locking assembly can incorporate two or more tabs and two or more grooves. For example, in the embodiment shown in FIGS. 3, 5-7, and 10, there can be a first tab 131 positioned on the exterior surface of fixed clamping arm 113 and a second tab 132 positioned on pivoting clamping arm 114 both of which engage and travel within two separate grooves of collar 125 during normal operation. For example, a first groove can be "L" shaped with a vertical portion 133, a horizontal portion 134 that is substantially perpendicular to the vertical portion, and an opening 135 at the end of vertical portion at the edge of collar 125. In this embodiment, second tab 132 can align with opening 156 of a second groove 138 when the collar 125 is placed onto the clamps during initial assembly. As mentioned above, vertical portion 133 can extend from the edge of collar 125 to form an "L" intersection with the horizontal portion 134. Vertical portion 133 can include a ramped profile to hinder reverse movement first tab 131 back up the vertical portion 133 once first tab 131 fully engages horizontal portion 134 of the first groove 136. Once first tab 131 is positioned in horizontal portion 134 of first groove 136, the terminal end of the horizontal portion can control distance collar 125 can be rotated. Interaction between horizontal portion of groove and first tab can help to maintain vertical position of rod receiver 101. It should be noted that there are various ways to maintain vertical position, for example, interaction between a groove in rod receiver and ledge on inside of collar. Second tab can also engage with and travel through second groove as the collar is rotated to the optional clutch position depression and/or lock position depression in that same fashion as for previously described embodiments. For example, second tab 132 rides second groove encountering clutch position depression first and then a lock position depression as collar 125 is rotated further.

Generally, grooves can be linear, coiled, or other have other patterns and can be stepped and/or sloped (or ramped) along the groove (e.g. ramped or sloped) to progressively increase or decrease clamping pressure of mobile clamp. It should be noted engagement of tab with a ramped surface of groove can be used (in combination with flange described below or independently of flange) to apply sufficient pressure of clamping arms about base to hold rod receiver 101 substantially stationary while the user manipulates the collar 125. Stepping may be accomplished by deployment of any number of depression points that can lock the collar in place preventing tab from backing out. Marked points on a stationary element (e.g. fixed clamp) and graduation marks (e.g. numbers, symbols, words) on the collar can be deployed as an aid to the user for setting appropriate lock/clutch adjustment.

In one embodiment, the clamp assembly 109 can incorporate a mechanism to engage the upper surface of base 108 exerting pressure upon the same and holding the rod receiver 101 substantially stationary while the user manipulates the collar 125. For example, in the embodiment shown in FIG. 3-4, flange 139, which in this embodiment is shown as an integral component of pivoting clamping arm 114, initially contacts upper surface of base 108 at its terminus 140 as a user pushes rod receiver 101 down upon the base 108. This force and contact between flange 139 and the upper surface of base 108 causes pivoting clamping arm 114 to pivot about pin 115 and close thereby fully engaging base 108. In operation, this supplies an initial gripping force between clamp assembly 109 and base 108 such that collar 125 may be manipulated by the user without slippage thus promoting single handed operation. In one embodiment, flange 139 can be contoured to follow the profile of base 108. Alternatively, as shown in the embodiment illustrated in FIGS. 3-4 and 5-7, flange 139 can be designed such that its profile is slightly offset (or a different contour) to that of base 108 in order to facilitate a pinching effect on base 108 to enhance or strengthen the gripping pressure and effectiveness of clamping arms. In this embodiment, the flange's offset profile can be accomplished by slightly reducing the angle at the intersection 141 of flange 139 and pivoting clamping arm 114.

Figure 8C:
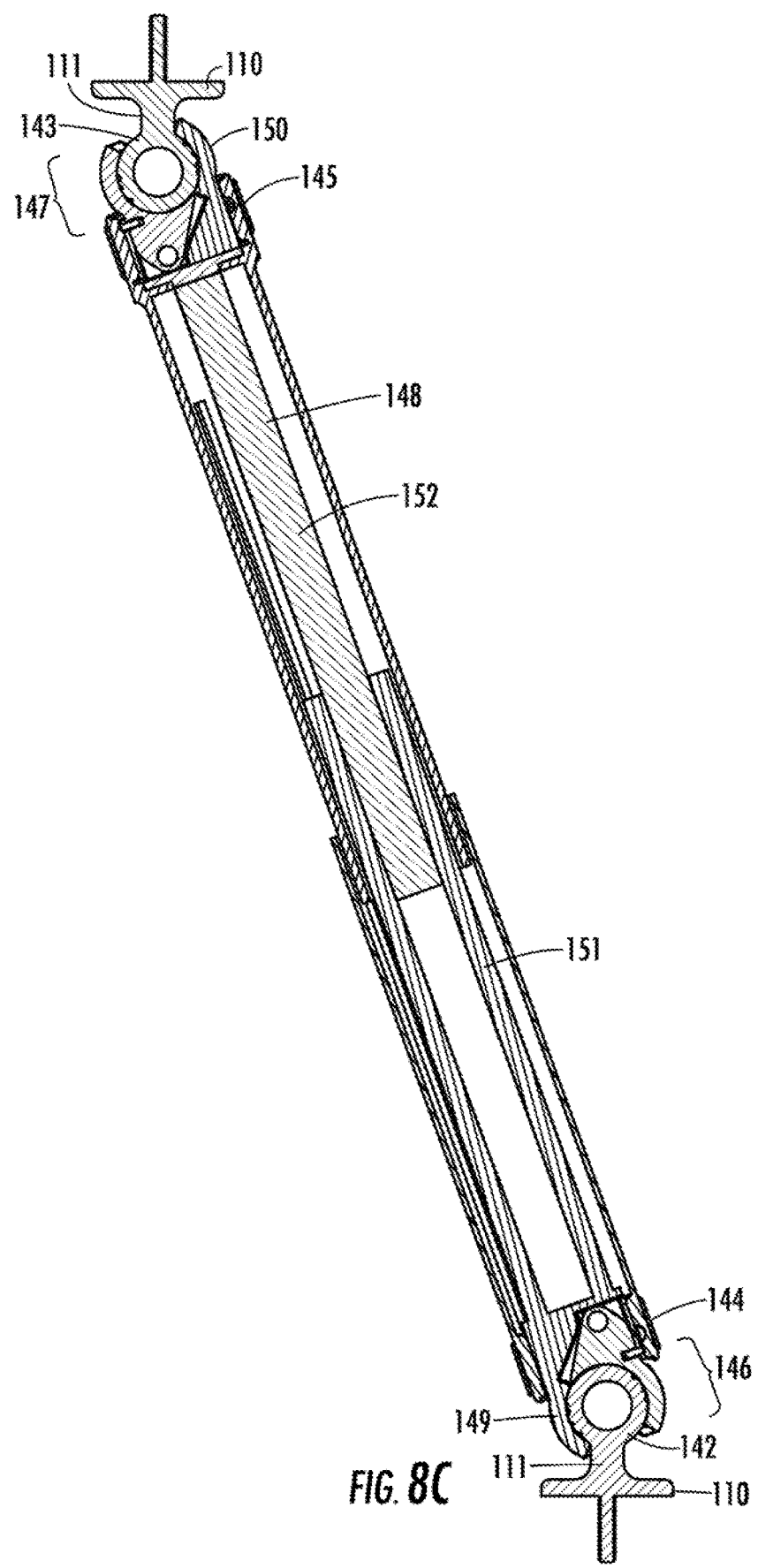
Figure 10D:
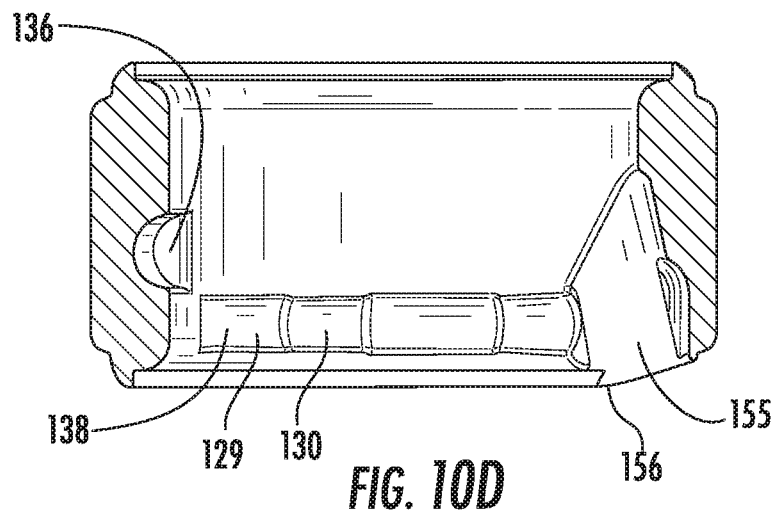
Figure 10E:
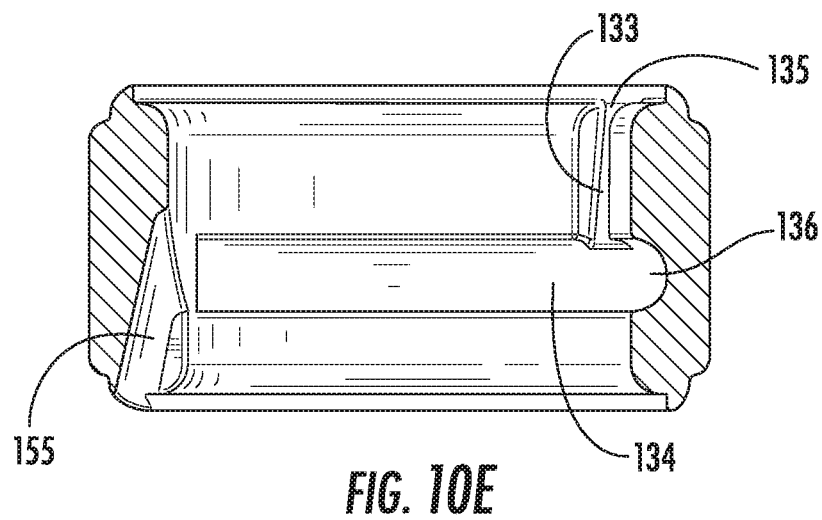
Figure 10F:
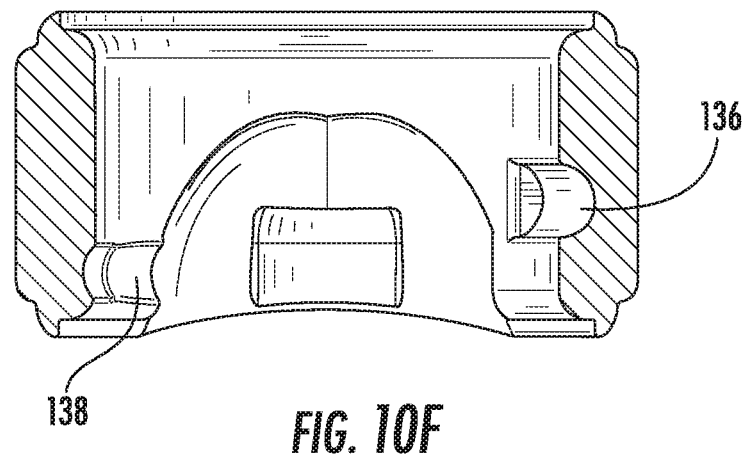

In another embodiment, the rod holder assembly 100 can be double ended as shown in FIG. 8. This design can be used as an extendable version of the rod holder assembly 100, for example, rendering a remote first base 142 accessible to the user who can then attach a desired object with a second base 143 affixed thereto. In one embodiment, the user can maneuver either a first collar 144 or a second collar 145 at opposite ends to tighten a first and second clamp assembly 146, 147 about first and second bases 142, 143. First and second clamp assemblies can be mechanically joined to prevent independent rotation or movement with respect to one another. For example, in one embodiment, first and second clamp assemblies are joined by shaft 148 or the like connecting first and second fixed clamping arms 149, 150. In an alternative embodiment, shaft 148 is a two component adjustable design wherein the length of said shaft 148 can be adjusted according to need. In this embodiment, a first shaft element 151 attached to first fixed clamping arm is slidably engaged to a second shaft element 152 attached to second fixed clamping arm wherein said second shaft element 152 is hollow and houses said first shaft element 151. In one embodiment, in order to maintain positional orientation of the clamping assemblies, shaft can be square shaped or triangular shaped or the like to prevent rotation.

As discussed above, the double ended rod holder assembly can include first and second collars 144, 145 that are mechanically engaged. For example, in the embodiment shown in FIG. 8, first collar 144 contains an elongated tube that fits within and is housed by elongated tube of second collar 145 or vice versa. As illustrated in this embodiment, first collar 144 can include an elongated slot 153 and second collar 145 can include a tab 154 that engages with and travels through slot 153 thus facilitating overall assembly extension, but preventing independent rotation of first and second collar. Thus, if the user rotates one collar, the other collar also rotates. In an alternative embodiment, the elongated tubes can be fluted which also facilitates assembly extension but prevents independent rotation. In an alternative embodiment, the collars can be joined by an intermediate extension that is slidably engaged to (and housed within) first and second collars. The desired length of the double ended rod holder assembly can be controlled by spring loaded buttons and corresponding apertures positioned along collars. Finally, internal grooves on interior surfaces of first and second collars can be sloped and include clutch and lock depressions. In one embodiment, first grove's configuration (e.g., slope and/or depressions) is the reverse of second groove's configuration such that the opposing clamping assemblies have coordinated clamping and release functionality.

In operation a user can mount and manipulate the positional orientation of various desired objects as well as lock the positional orientation of the object (e.g., a rod receiver or rod holder) into place or set the assembly to clutch or slip in response to an external force. In some embodiments, the object can already be affixed to one or more of the assembly components, for example, a rod receiver may be affixed to a fixed clamping arm of the clamping assembly as described herein. A user can place the clamping assembly upon a substantially spherical base which upon contact with a flange connected to a pivoting clamping arm causes pivoting arm to pivot about a pin and closes the pivoting clamping arm about the base applying pressure to said base. This provides stability to the mounted object (e.g., rod receiver) whereby the user can manipulate various other components of the assembly and/or the mounted object itself without the object falling out of the assembly or changing the desired and preset orientation. The user can lower the collar (or raise the collar depending on its position) utilizing a locking assembly to apply additional pressure of clamping arms about the base. The locking assembly can be adjusted by the user to substantially lock the positional orientation of the mounted object or set the assembly such that it clutches or slips in response to an external force. In some embodiments, the user can apply a pinching force to the upper exterior surface of the base by flange which amplifies the clamping or gripping force on base.

Clutching and locking function can be facilitated by protrusions positioned, in some embodiments, on the interior face(s) of clamping arms. If the user wishes to set the assembly to clutch, the user can rotate the collar to engage tab with a clutch position depression in a groove applying a certain amount of pressure of clamping arms about base. In one embodiment, this clutch setting results in contact between large protrusions on the interior face(s) of clamping arms and base. If the user wishes to set the assembly to lock, the user can rotate the collar to engage tab with a lock position depression in a groove applying a greater amount of pressure of clamping arms about base. In one embodiment, the lock setting results in contact between large and small protrusions on the interior face(s) of clamping arms and base. To release the rod receiver or other object, all the user has to do is reverse the steps described above, such as rotate the collar in the opposite direction, raise or lower to collar depending on orientation (e.g., grove configuration), and lift the object free of the base or clamping assembly depending on orientation of the various components.

As discussed previously, flange and base contact can supply user with a degree of pressure of clamping arms about the base to allow further manipulation and adjustments without losing the positional orientation of the mounted object (e.g., rod receiver). Likewise, grooves may be ramped or sloped whereby contact with tab and continued travel of tab through groove as user rotates collar and/or moves collar down or up increases pressure of clamping arms about base providing further stability to the mounted object for further user manipulation of the assembly. The ramped feature also can work in concert with the lock and clutch positional depressions to achieve the desired amount of pressure for each function.

In another embodiment, a user can reach a remotely mounted substantially spherical base at one end of the assembly and attach an object to be mounted at the other end of the assembly. In one embodiment, the second base is already mounted to the desired object. The user can place a first clamping assembly about the first base and a second clamping assembly about a second base, which can be already affixed to the desired object to be mounted. Rotation of one collar in this double ended assembly applies pressure of both sets of clamping arms in first and second clamping assemblies about each base simultaneously and can likewise set the assemblies to clutch and lock about the bases. The user can extend this assembly to reach ever more remote objects and bases by, for example, pressing a tab extending through an aperture in one of the elongated tubular portions and sliding the tubular portions to extend the assembly length.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A rod holder assembly comprising:
   a substantially tubular rod receiver comprising an upper open end, a bottom end, and a hollow interior for receiving a rod;
   a substantially spherical base comprising a rounded profile and an exterior surface;
   a clamp assembly comprising a first clamping arm and a second clamping arm, wherein said first and second clamping arms comprise a first gripper member and a second gripper member each comprising a concave inner surface conforming to the rounded profile of said base;
   wherein said first clamping arm is an integral and fixed extension of the rod receiver and comprises an integral tubular portion positioned between said first gripper member and said rod receiver and wherein said tubular portion comprises an exterior surface, and a slot for second clamping arm attachment;
   wherein said second clamping arm comprises a pivot head portion integrally attached to said second gripper member;
   wherein said second clamping arm is pivotably engaged to said first clamping arm through said pivot head portion engaging said slot of said tubular portion;
   wherein said tubular portion and said pivot head portion together define a channel when said second clamping arm is pivotably engaged to said first clamping arm; and
   a locking assembly comprising a ring shaped lock collar positioned about and rotatably engaged to the exterior surface of the tubular portion of said first clamping arm, wherein said lock collar comprises an inner surface with a circumference and a first groove positioned about the circumference of the inner surface, and further comprising a first tab affixed to said second clamping arm for locking interaction with said first groove.

2. The rod holder assembly of claim 1 wherein said pivot head portion further comprises a flange for base engagement to promote an initial gripping force between said clamp assembly and said base.

3. The rod holder assembly of claim 2 wherein the flange comprises an inner arced surface for gripping engagement with the exterior surface of the base.

4. The rod holder assembly of claim 3, wherein the inner arced surface comprises a profile that is slip offset from the exterior surface of the base to generate a pinching effect on said base.

5. The rod holder assembly of claim 1, wherein the base exterior surface compressible.

6. The rod holder assembly of claim 1, wherein said first tab is a bean g.

7. The rod holder assembly of claim 1 wherein the first and second gripper members further comprise protrusions on the concave inner surfaces.

8. The rod holder assembly of claim 1 further comprising a pin inserted into said channel for securing the pivot head portion of the second clamping arm to the tubular portion of said first clamping arm following insertion of said pivot head portion into the slot of said tubular portion.

9. The rod holder assembly of claim 1 wherein said first groove is sloped to facilitate progressive tightening of said clamping arms about the base as the first tab travels through said first groove.

10. The rod holder assembly of claim 1 wherein said first groove comprises a clutch position that engages the first tab and facilitates a degree of slippage in an orientation of said rod receiver in response to sufficient external force.

11. The rod holder assembly of claim 1 wherein said first groove comprises a lock position that engages the first tab and substantially prohibits slippage in an orientation of said rod receiver in response to an external force.

12. The rod holder assembly of claim 1 wherein said locking assembly further comprises a second tab positioned on the exterior surface of the tubular portion of the first clamping arm, and a second groove positioned about the circumference of the inner surface of said collar that engages the second tab.

13. The rod holder assembly of claim 12 wherein said second groove comprises a clutch position that engages the second tab and facilitates a degree of lippage in an orientation of said rod receiver in response to sufficient external force.

14. The rod holder assembly of claim 12 wherein said second groove comprises a lock position that engages the second tab and substantially prohibits slippage in an orientation of said rod receiver in response to an external force.

* * * * *